United States Patent
Seetharam

(10) Patent No.: US 7,617,448 B2
(45) Date of Patent: Nov. 10, 2009

(54) METHOD AND SYSTEM FOR VALIDATION OF STRUCTURED DOCUMENTS

(75) Inventor: Shirish Seetharam, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 766 days.

(21) Appl. No.: 11/220,250

(22) Filed: Sep. 6, 2005

(65) Prior Publication Data

US 2007/0055927 A1 Mar. 8, 2007

(51) Int. Cl.
*G06F 17/00* (2006.01)
(52) U.S. Cl. ..................................... 715/237
(58) Field of Classification Search .................. 715/237
See application file for complete search history.

(56) References Cited

U.S. PATENT DOCUMENTS

| | | |
|---|---|---|
| 2004/0006744 A1 | 1/2004 | Little et al. |
| 2005/0039166 A1 | 2/2005 | Rogers et al. |
| 2005/0177543 A1* | 8/2005 | Chen et al. ..................... 707/1 |
| 2006/0004729 A1* | 1/2006 | Zhilyaev et al. ................ 707/3 |

* cited by examiner

*Primary Examiner*—Doug Hutton
*Assistant Examiner*—Ashley Fortino
(74) *Attorney, Agent, or Firm*—Trellis IP Law Group, PC

(57) ABSTRACT

A method and apparatus for validation of structured documents are provided. The method includes searching a fast parser for an instance of a structured document. Further, the method includes parsing the instance by using the fast parser, if the fast parser is available. If no fast parser is available, the method includes parsing the instance by using a generic parser, and generating the fast parser for the structured document, in parallel. The generation of the fast parsers is based on the structure of the structured documents.

8 Claims, 4 Drawing Sheets

US 7,617,448 B2

METHOD AND SYSTEM FOR VALIDATION OF STRUCTURED DOCUMENTS

BACKGROUND OF THE INVENTION

1. Field of Invention

Embodiments of the invention relate, in general, to content networking. More specifically, the embodiments of the invention relate to the methods and systems for the validation of structured documents.

2. Description of the Background Art

There has been a tremendous growth in the area of content networking over the past few years. The use of markup languages, like eXtensible Markup Language (XML), promoted domain-specific standards that encourage the sharing of information.

A structured document needs to be validated against a schema that defines it. In conventional techniques, validation involves post-processing a parsed structured document. The process of parsing the structured documents is conducted by using generic parsers.

A single generic parser is used for validating the structured documents that are defined by various schemas. Using the single generic parser for the structured document is a slow process, as compared to using specific parsers for each schema.

Furthermore, validation of a large number of structured documents by using the single generic parser can slow down the speed of the content networking system. This, in turn, may affect the overall performance of the content networking system.

DETAILED DESCRIPTION OF EMBODIMENTS OF THE INVENTION

Various embodiments of the invention provide a method, a system, and a computer program product for validation of structured documents. The embodiments of the invention provide a method that enables validation of structured documents. The method includes searching for a fast parser for an instance of a structured document. Further, the method includes parsing the instance by using the fast parser, if the fast parser is available. If no fast parser is available, the method includes parsing the instance by using a generic parser, and generating the fast parser for the structured document, in parallel.

A structured document can be defined as a data format that can be deterministically divided into tags and data. Examples of structured documents include, but are not limited to, Standard Generalized Markup Language (SGML), eXtensible Markup Language (XML), Java properties files, and delimited value files like CSV files.

Figure 1:
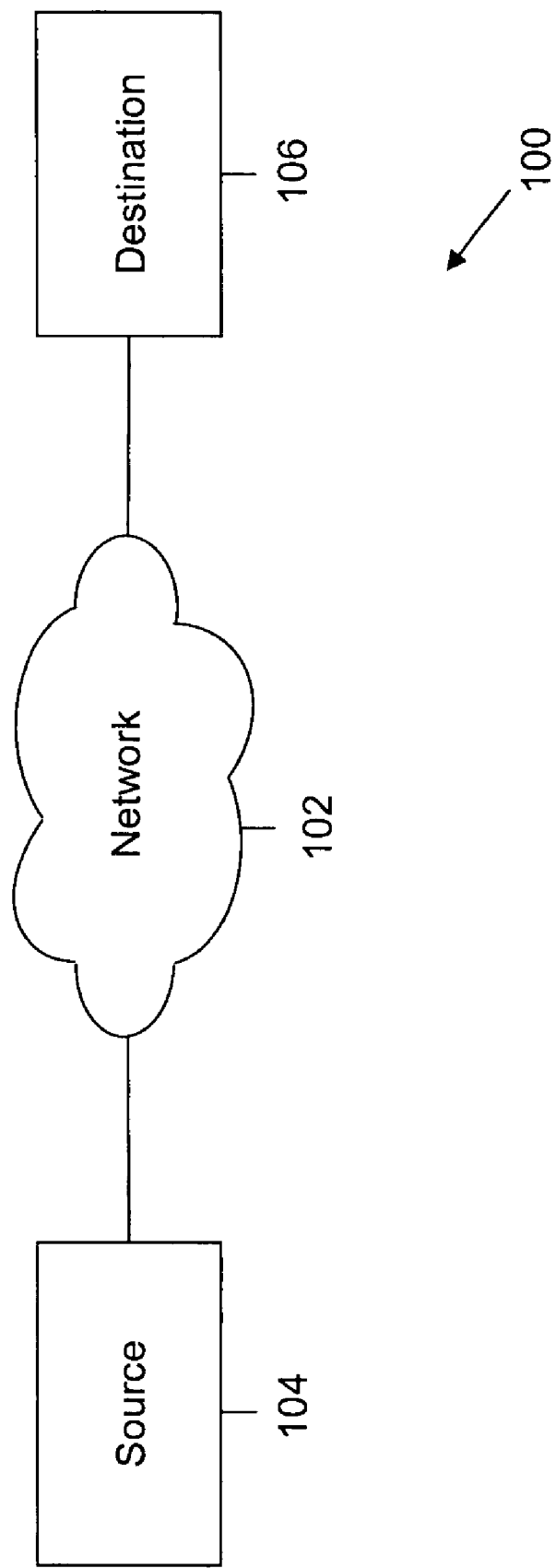
FIG. 1 illustrates a network environment for implementing an embodiment of the invention.

FIG. 1 illustrates a network environment 100 for implementing an embodiment of the invention. Network environment 100 includes a source 104 and a destination 106, connected to a network 102. Network 102 can be a collection of individual networks, interconnected with each other and functioning as a single large network. Examples of such networks include, but are not limited to, a Local Area Network (LAN), a Wide Area Network (WAN), a Metropolitan Area Network (MAN), and a Virtual Private Network (VPN). Source 104 can be a computing system that processes the structured documents. Examples of source 104 can include, but are not limited to, an application server, a network appliance, and a routing system. In an embodiment of the invention, destination 106 can be a requesting unit that requests source 104 to process the structured documents. In another embodiment of the invention, destination 106 can be a display unit that displays the results of the processing of the structured documents. Examples of destination 106 can include, but are not limited to, a client and a display device.

Figure 2:
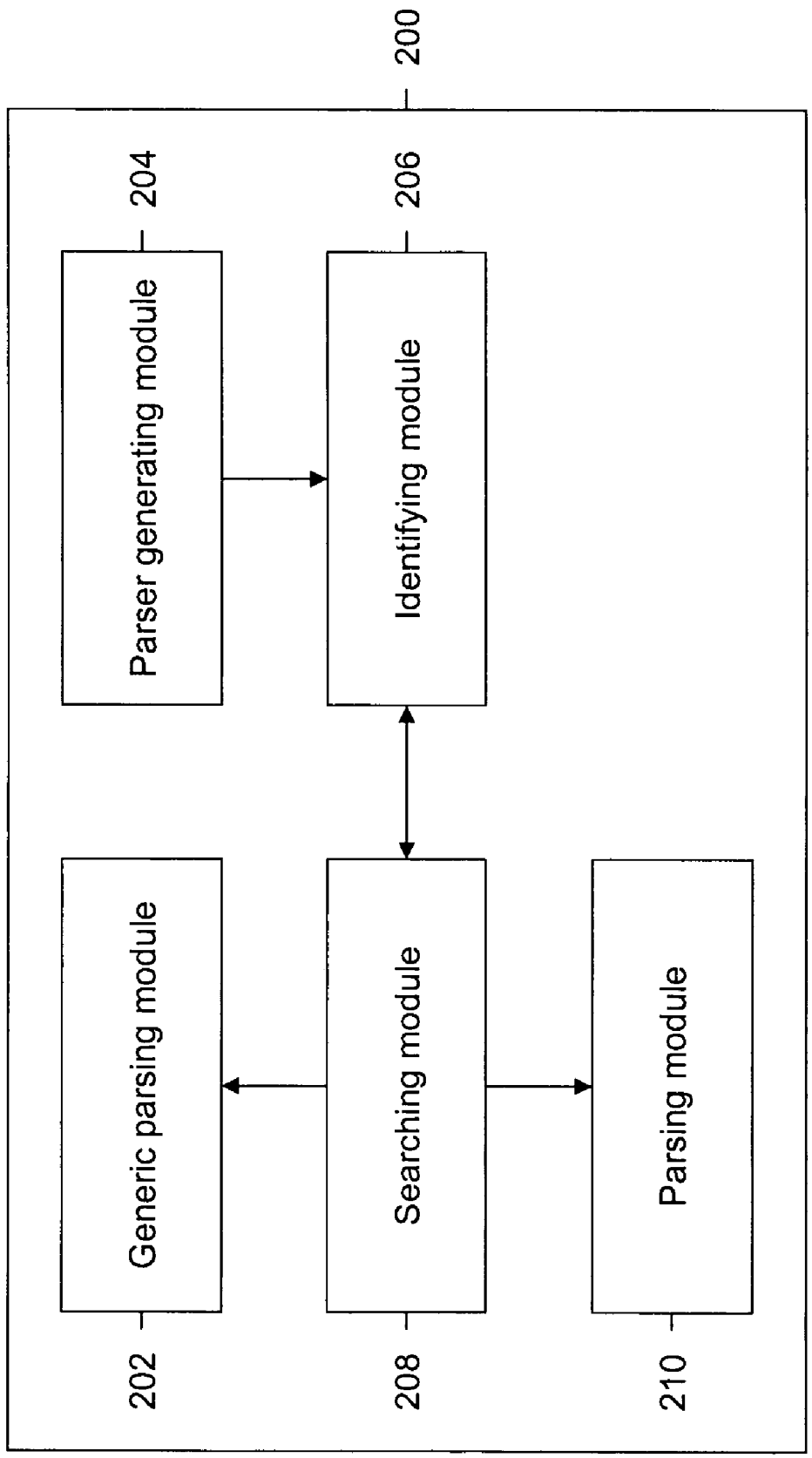
FIG. 2 illustrates a system for validation of structured documents, in accordance with an exemplary embodiment of the invention.

FIG. 2 illustrates a system 200 for validation of structured documents, in accordance with an exemplary embodiment of the invention. System 200 includes a generic parsing module 202, a parser generating module 204, an identifying module 206, a searching module 208 and a parsing module 210.

System 200 uses fast parsers and a generic parser to validate the structured documents. In accordance with various embodiments of the invention, each structured document can be represented by a Context Free Grammar (CFG). An example of the structured documents is XML documents with either schema or Document Type Definition (DTD) information.

A fast parser for a structured document is defined as a parser that is generated specifically for the structured document, and is faster than the generic parser. In accordance with various embodiments of the invention, the generation of the fast parser is based on the structure of the structured document. In accordance with various embodiments of the invention, a CFG representing a structured document can be used to generate a fast parser that uses Left-to-right Rightmost derivation with k-token look ahead (LR (k)) parse tables, corresponding to the structured document. In accordance with various embodiments of the invention, parser generating module 204 generates these fast parsers. In accordance with various embodiments of the invention, parser generating module 204 includes a memory for storing the fast parsers.

Validation of a large number of structured documents would result in a large set of fast parsers. However, since the resources on any given system are limited, a subset of the fast parsers may be identified. Identifying module 206 identifies a subset of the fast parsers, in accordance with various embodiments of the invention. The process of identification of the subset may be based on a pre-defined criterion. In accordance with an embodiment of the invention, the pre-defined criterion may include identifying the fast parsers that have been used most recently. In accordance with another embodiment of the invention, the pre-defined criterion may include identifying the fast parsers that have been used most frequently. This identified subset of the fast parsers may be referred to as a subset of active fast parsers.

When system 200 receives a request for validating a structured document, searching module 208 searches for a fast parser, corresponding to an instance of the structured document from the identified subset of the fast parsers. If the corresponding fast parser is available in the identified subset of the fast parsers, parsing module 210 parses the instance by using the corresponding fast parser.

When no fast parser is available corresponding to the instance of the structured document, generic parsing module 202 parses the instance by using the generic parser. In parallel, parser generating module 204 generates a fast parser for the structured document. In accordance with various embodiments of the invention, parser generating module 204 may use an Abstract Syntax Tree (AST) generated by generic parsing module 202 in the process of parsing the instance of the structured document. Further, other instances of the structured document are parsed by using the generated fast parser.

Figure 3:
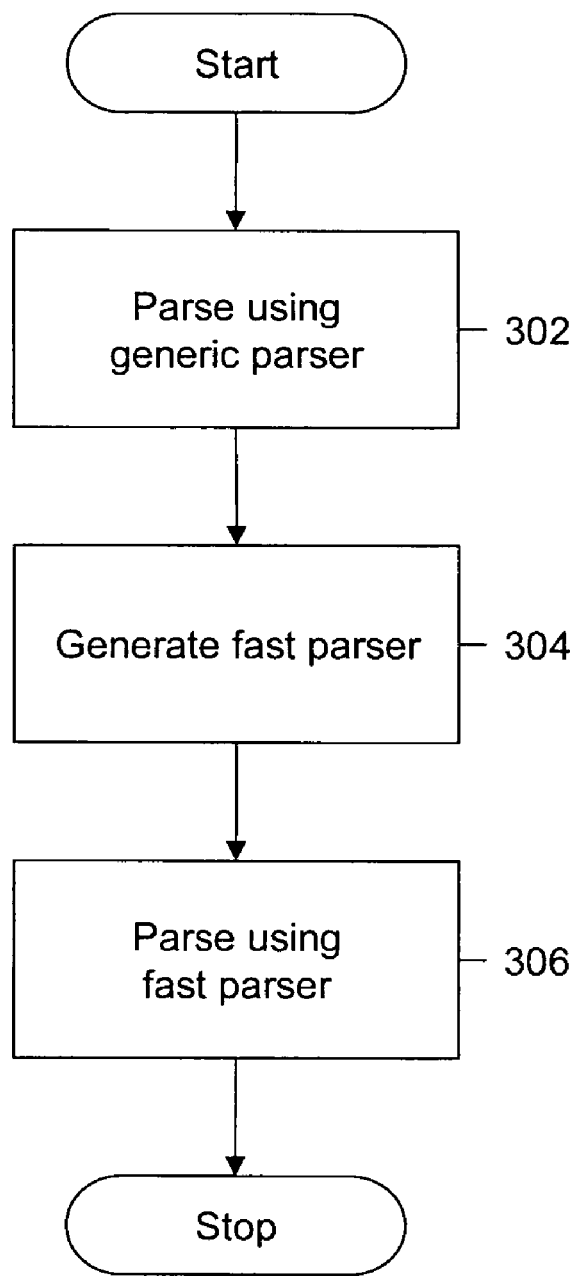
FIG. 3 is a flow chart depicting the requisite steps for validation of the structured documents, in accordance with an exemplary embodiment of the invention.

FIG. 3 is a flow chart depicting the requisite steps for validation of the structured documents, in accordance with an exemplary embodiment of the invention.

At step 302, generic parsing module 202 parses a first instance of a structured document by using a generic parser. At step 304, parser generating module 204 generates a fast parser corresponding to the structured document. Steps 302 and 304 are performed in parallel, in accordance with various embodiments of the invention. At step 306, parsing module 210 parses other instances of the structured document by using the fast parser generated at step 304.

Figure 4:
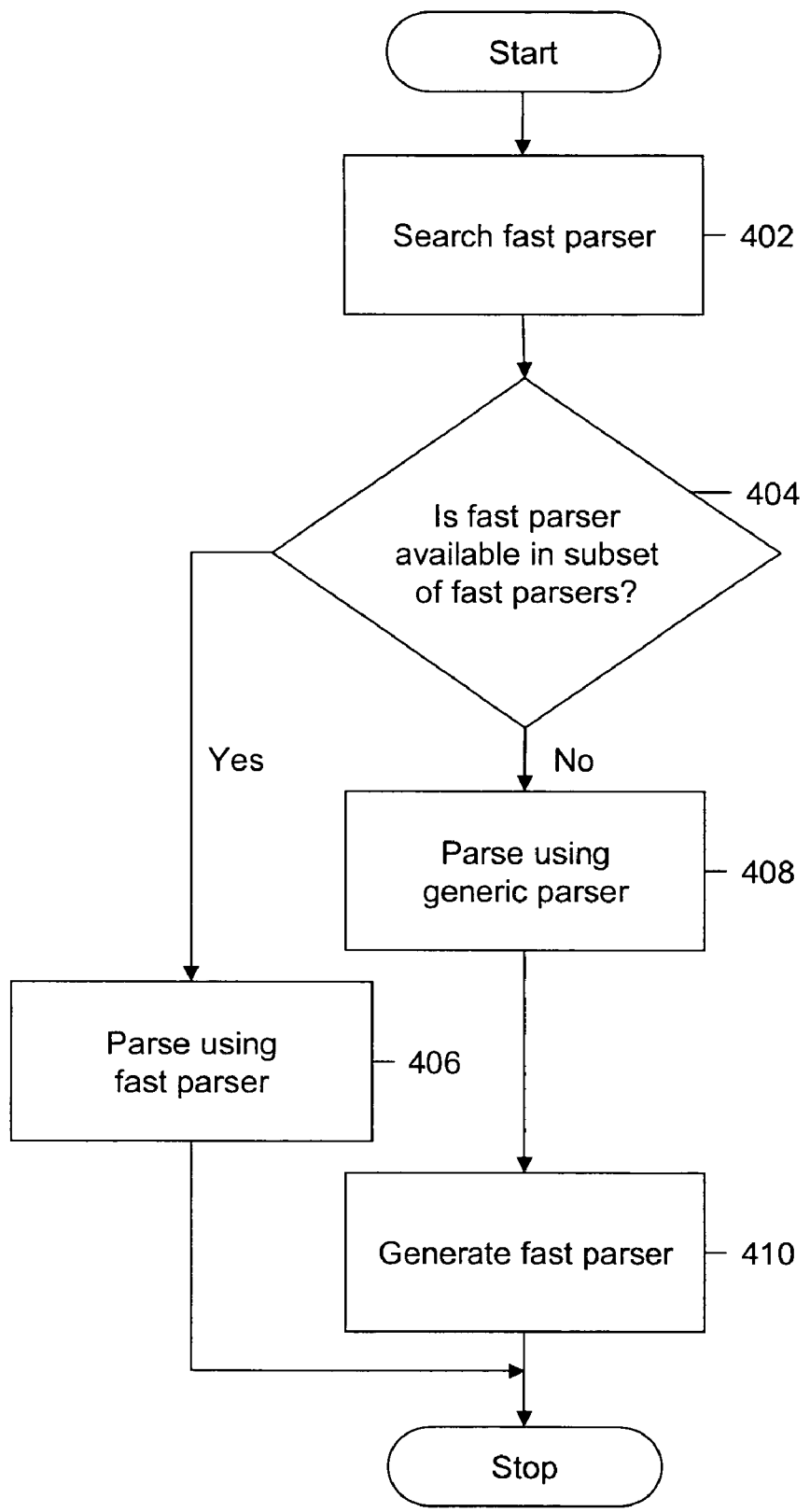
FIG. 4 is a flow chart depicting the requisite steps for validation of the structured documents, in accordance with another exemplary embodiment of the invention.

FIG. 4 is a flow chart depicting the requisite steps for validation of the structured documents, in accordance with another exemplary embodiment of the invention.

At step 402, searching module 208 searches a fast parser corresponding to an instance of a structured document. At step 404, it is checked whether the corresponding fast parser is available in the identified subset of the fast parsers. If the corresponding fast parser is available, step 406 is performed. In accordance with step 406, parsing module 210 parses the instance of the structured document by using the corresponding fast parser. If, at step 404, it is found that no corresponding fast parser is available, step 408 is performed. In accordance with step 408, generic parsing module 202 parses the instance of the structured document by using the generic parser. At step 410, parser generating module 204 generates a fast parser, corresponding to the structured document. Steps 408 and 410 can be performed in parallel, in accordance with an embodiment of the invention. Steps 402 to 406 can be performed for the other instances of the structured document. Steps 402, 404, 408 and 410 can be performed for each structured document that has no corresponding fast parser available.

Embodiments of the invention have the advantage that the method provided for validation of structured documents is feasible and easy to scale. When the structured documents with an active fast parser are processed repeatedly, the performance of system 200 is enhanced. When there is no active fast parser available, a fast parser is generated, in parallel, while the parsing is performed by using the generic parser. Therefore, the performance of system 200 is the same as that using the generic parser. Further, the task of validation may be offloaded to peripheral servers other than a main server.

Although the invention has been discussed with respect to specific embodiments thereof, these embodiments are merely illustrative, and not restrictive, of the invention. For example, a 'method for validation of structured documents' can include any type of analysis, manual or automatic, to anticipate the needs of validation of the structured documents.

Although specific protocols have been used to describe embodiments, other embodiments can use other transmission protocols or standards. Use of the terms 'peer', 'client', and 'server' can include any type of device, operation, or other process. The invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the invention, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the invention.

Also in the description herein for embodiments of the invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the invention.

A 'computer readable medium' for purposes of embodiments of the invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the invention may be combined in any suitable manner with one or more other embodiments. It is to be understood that other variations and modifications of the embodiments of the invention described and illustrated herein are possible in light of the teachings herein and are to be considered as part of the spirit and scope of the invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for validation of structured documents, the method comprising
    parsing a first instance of a first structured document by using a generic parser;
    generating a fast parser for the first structured document, the fast parser being faster than the generic parser, the fast parser being generated based on the structure of the first structured document;
    parsing a second instance of the first structured document using the fast parser;
    identifying a subset of fast parsers from a group of fast parsers consisting of fast parsers used most recently and fast parsers used most frequently;
    searching a corresponding fast parser for an instance of a second structured document from the identified subset of the fast parsers; and
    if the corresponding fast parser is available in the identified subset of the fast parsers,
    parsing the instance of the second structured document by using the corresponding fast parser;
    else,
    parsing the instance of the second structured document by using the generic parser.

2. The method of claim 1, wherein each structured document being represented by a Context Free Grammar (CFG).

3. The method of claim 1, wherein the generating comprises using Left-to-right Rightmost derivation with k-token look ahead (LR (k)) parse tables.

4. A method for validation of structured documents, each structured document being represented by a Context Free Grammar (CFG), the method comprising
    parsing a first instance of a first structured document by using a generic parser;
    generating a fast parser for the first structured document, the fast parser being faster than the generic parser, the fast parser being generated based on the structure of the first structured document, the fast parser being generated using Left-to-right Rightmost derivation with k-token look ahead (LR (k)) parse tables;
    parsing a second instance of the first structured document using the fast parser;
    identifying a subset of fast parsers from a group of fast parsers consisting of fast parsers used most recently and fast parsers used most frequently;
    searching a corresponding fast parser for an instance of a second structured document from the identified subset of the fast parsers; and
    if the corresponding fast parser is available in the identified subset of the fast parsers,
    parsing the instance of the second structured document by using the corresponding fast parser;
    else,
    parsing the instance of the second structured document by using the generic parser.

5. A system for validation of structured documents, the system comprising
    means for parsing a first instance of a first structured document by using a generic parser;
    means for generating a fast parser for the first structured document, the fast parser being faster than the generic parser, the fast parser being generated based on the structure of the first structured document; and means for parsing at least one instance of the first structured document, the at least one instance being different from the first instance, wherein the parsing comprises using the fast parser:

means for identifying a subset of fast parsers from a group of fast parsers consisting of fast parsers used most recently and fast parsers used most frequently; and means for searching a corresponding fast parser for an instance of a second structured document from the identified subset of the fast parsers, whereby the parsing module parses the instance of the second structured document by using the corresponding fast parser.

6. A system for validation of structured documents, the system comprising a computer-readable storage medium;

a generic parsing module for parsing a first instance of a first structured document by using a generic parser;

a parser generating module for generating a fast parser for the first structured document, the fast parser being faster than the generic parser, the fast parser being generated based on the structure of the first structured document;

a parsing module for parsing a second instance of the first structured document using the fast parser;

an identifying module for identifying a subset of fast parsers from a group of fast parsers consisting of fast parsers used most recently and fast parsers used most frequently; and a searching module for searching a corresponding fast parser for an instance of a second structured document from the identified subset of the fast parsers, whereby the parsing module parses the instance of the second structured document by using the corresponding fast parser.

7. A machine-readable storage medium including instructions for validation of structured documents executable by a computer processor, the medium comprising one or more instructions for parsing a first instance of a first structured document by using a generic parser;

one or more instructions for generating a fast parser for the first structured document, the fast parser being faster than the generic parser, the fast parser being generated based on the structure of the first structured document;

one or more instructions for parsing at least one instance of the first structured document, the at least one instance being different from the first instance, wherein the parsing comprises using the fast parser;

one or more instructions for identifying a subset of fast parsers from a group of fast parsers consisting of fast parsers used most recently and fast parsers used most frequently;

one or more instructions for searching a corresponding fast parser for an instance of a second structured document from the identified subset of the fast parsers;

one or more instructions for determining if the corresponding fast parser is available in the identified subset of the fast parsers, one or more instructions for parsing the instance of the second structured document by using the corresponding fast parser; and else, one or more instructions for parsing the instance of the second structured document by using the generic parser.

8. An apparatus for validation of structured documents, the apparatus comprising a processing system including one or more computer processors coupled to a display and user input device; and a machine-readable medium including instructions for validation of structured documents executable by the one or more computer processors, the medium comprising one or more instructions for parsing a first instance of a first structured document by using a generic parser;

one or more instructions for generating a fast parser for the first structured document, the fast parser being faster than the generic parser, the fast parser being generated based on the structure of the first structured document;

one or more instructions for parsing a second instance of the first structured document using the fast parser:

one or more instructions for identifying a subset of fast parsers from a group of fast parsers consisting of fast parsers used most recently and fast parsers used most frequently;

one or more instructions for searching a corresponding fast parser for an instance of a second structured document from the identified subset of the fast parsers;

one or more instructions for determining if the corresponding fast parser is available in the identified subset of the fast parsers, one or more instructions for parsing the instance of the second structured document by using the corresponding fast parser; and else, one or more instructions for parsing the instance of the second structured document by using the generic parser.

* * * * *

UNITED STATES PATENT AND TRADEMARK OFFICE
CERTIFICATE OF CORRECTION

PATENT NO. : 7,617,448 B2  Page 1 of 1
APPLICATION NO. : 11/220250
DATED : November 10, 2009
INVENTOR(S) : Shirish Seetharam It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1100 days.

Signed and Sealed this

Nineteenth Day of October, 2010

David J. Kappos
*Director of the United States Patent and Trademark Office*